US008490743B2

(12) United States Patent
Schnitta

(10) Patent No.: US 8,490,743 B2
(45) Date of Patent: Jul. 23, 2013

(54) PERFORATION ACOUSTIC MUFFLER ASSEMBLY AND METHOD OF REDUCING NOISE TRANSMISSION THROUGH OBJECTS

(76) Inventor: Bonnie S Schnitta, East Hampton, NY (US)

( * ) Notice: Subject to any disclaimer, the term of this patent is extended or adjusted under 35 U.S.C. 154(b) by 0 days.

(21) Appl. No.: 13/270,036

(22) Filed: Oct. 10, 2011

(65) Prior Publication Data

US 2012/0024621 A1    Feb. 2, 2012

Related U.S. Application Data

(63) Continuation of application No. 12/425,925, filed on Apr. 17, 2009, now Pat. No. 8,061,474, which is a continuation-in-part of application No. 11/017,642, filed on Dec. 22, 2004.

(60) Provisional application No. 60/530,981, filed on Dec. 22, 2003.

(51) Int. Cl.
*G10K 11/168*    (2006.01)

(52) U.S. Cl.
USPC .......................................... 181/205; 181/148

(58) Field of Classification Search
USPC ............... 181/148, 155, 156, 179, 182, 184, 181/198, 199, 200, 201, 202, 205, 224; 362/217, 362/218
See application file for complete search history.

(56) References Cited

U.S. PATENT DOCUMENTS

| | | | | |
|---|---|---|---|---|
| 2,744,584 A | * | 5/1956 | Hellon | 181/150 |
| 4,161,995 A | * | 7/1979 | Pohlmann et al. | 181/150 |
| 4,362,222 A | * | 12/1982 | Hellstrom | 181/30 |
| 4,437,541 A | * | 3/1984 | Cross | 181/151 |
| 4,837,837 A | * | 6/1989 | Taddeo | 381/346 |
| 5,191,176 A | * | 3/1993 | Wright | 181/148 |
| 5,334,806 A | * | 8/1994 | Avery | 181/286 |
| 5,513,270 A | * | 4/1996 | Lewis | 381/338 |
| 5,659,155 A | * | 8/1997 | Porzilli | 181/0.5 |
| 6,098,743 A | * | 8/2000 | McGrath | 181/150 |
| 6,206,999 B1 | * | 3/2001 | Ritto et al. | 156/245 |
| 6,223,853 B1 | * | 5/2001 | Huon et al. | 181/145 |
| 6,324,292 B1 | * | 11/2001 | Mitsuhashi et al. | 381/349 |
| 6,338,395 B1 | * | 1/2002 | Setiabudi et al. | 181/151 |
| 6,411,721 B1 | * | 6/2002 | Spindler | 381/349 |
| 6,435,303 B1 | * | 8/2002 | Warnaka | 181/286 |

OTHER PUBLICATIONS

Wikipedia Page for Sound Transmission Class; http://en.wikipedia.org/wiki/Sound_transmission_class; accessed Oct. 17, 2012.*

* cited by examiner

*Primary Examiner* — Jeremy Luks
(74) *Attorney, Agent, or Firm* — John F. Vodopia

(57) ABSTRACT

A noise attenuation system is disclosed for use in a structure having a recessed fixture mounted therein or other unit which creates a hole in the structure in which it is secured, such as a ceiling. The noise attenuation system is constructed to permit the absorption of noise emitted into the structure from the mechanism. The noise attenuation includes a noise absorbing muffler positioned within the structure in an area substantially surrounding the mechanism. The noise absorbing layer includes an outer barrier layer that limits the passage of sound waves emitted from the mechanism therethrough. The noise absorbing muffler further includes a noise absorbing layer positioned adjacent the outer barrier layer. The noise absorbing layer absorbs a predetermined amount of sounds waves emitted from the recessed fixture. Additionally, an optional noise absorbing layer, or equivalent decoupling material can be included to decouple the barrier from the structure for low frequency noises.

19 Claims, 4 Drawing Sheets

PERFORATION ACOUSTIC MUFFLER ASSEMBLY AND METHOD OF REDUCING NOISE TRANSMISSION THROUGH OBJECTS

This application is a continuation of U.S. application Ser. No. 12/425,925, filed Apr. 17, 2009. U.S. application Ser. No. 12/425,925 is a continuation-in-part of U.S. application Ser. No. 11/017,642, filed Dec. 22, 2004, which, in turn, is based on and derives the benefit of the filing date of U.S. Provisional Patent Application No. 60/530,981, filed Dec. 22, 2003. The entirety of all of the above-listed Applications are incorporated herein by reference.

BACKGROUND OF THE INVENTION

1. Field of the Invention

The present invention relates to a'system for attenuating noise. In particular, the present invention relates to a system for attenuating noise that may be emitted from a room through a hole or opening. Additionally, the invention can attenuate noise when the opening houses any low STC object that cannot be completely enclosed, such as a recessed light fixture. The present invention further relates to a methodology for attenuating noise from a room that contains at least one hole or opening for receiving a low STC object that cannot be completely enclosed, such as a recessed light fixture or other mechanism.

2. Description of Related Art

Hearing noises such as for example, footsteps, speech, music or environmental sounds from adjacent rooms, upper floors, pipes, outside the dwelling or adjacent dwellings is something that many people experience on a daily basis. At a Minimum, it can be distracting. Many spend large sums of money to reduce the overall transmission of sound into and/or through their dwellings in order to create quieter surroundings. Various sound insulating techniques exist to significantly reduce and/or limit the transmission of sound through the walls, ceilings and other objects contained in today's commercial and residential buildings. A great deal of attention is paid to the configuration of the walls, floors and ceilings and the materials forming the same to provide for high transmission loss, which minimizes the transmission of noise from one room or space to another.

The configuration and the materials are rated by its STC. STC stands for "sound transmission class" and is a single number rating derived from measured values of sound transmission loss in accordance with the American Society for Testing and Materials (ASTM) E90 standards. The transmission loss through an object is a measure of its effectiveness in preventing the sound power incident on one side of the object from being transmitted through it and radiated on the other side. The STC provides a single number estimate of an object's performance for certain common sound reduction applications.

Typically, ceilings and walls have openings and/or holes formed therein to receive various devices including electrical outlets, air ducts, lighting, speakers; etc. While the walls, floors and ceilings can be adequately insulated to limit noise transmission, these openings have an adverse impact on the transmission loss. As such, noise can enter the room or space through the opening and the device mounted therein.

SUMMARY OF THE INVENTION

In response to the foregoing challenges, applicant has developed an innovative noise attenuation system for use in a structure having a hole for some type of mechanism, such as a recessed light fixture mounted therein, which cannot be addressed with a complete acoustic enclosure, due to required air flow for heat dissipation, or a needed opening, such as when a large quantity of wires is required. The noise attenuation system is constructed to permit the absorption of noise emitted into the structure from the mechanism such that the transmission loss of the structure is not adversely impacted by the presence of the opening and the mechanism located therein. The noise attenuation system is also constructed to permit dissipation of heat from the mechanism, if required. The noise attenuation includes a noise absorbing muffler positioned within the structure in an area substantially surrounding the mechanism. The noise absorbing muffler includes an outer high STC barrier layer that limits the passage of sound waves emitted from the mechanism therethrough. The noise absorbing muffler further includes a noise absorbing layer positioned adjacent to the outer barrier layer. The noise absorbing layer absorbs a predetermined amount of sounds waves emitted from the mechanism. An optional third layer can be secured to the barrier layer, which would be a noise decoupling layer. This is most commonly used when low frequency noise may need to be decoupled from the structure.

Applicant has also developed an innovative method for attenuating noise emitted from a recessed light fixture mounted in an opening in a structure. The method includes determining the minimum length of a noise attenuating muffler based upon a predetermined wavelength of a sound wave. Once the proper length of muffler is determined, the noise attenuating muffler is located within the structure in an area surrounding the mechanism. The noise attenuating muffler substantially absorbs the sound waves emitted into structure from the recessed fixture. Thus, when the sound exits the muffler the reduction in noise is equal to the transmission loss that would have occurred had there never been a hole.

BRIEF DESCRIPTION OF THE DRAWINGS

The invention will be described in conjunction with the following drawings in which like reference numerals designate like elements and wherein.

DETAILED DESCRIPTION OF SEVERAL EMBODIMENTS

Figure 1:
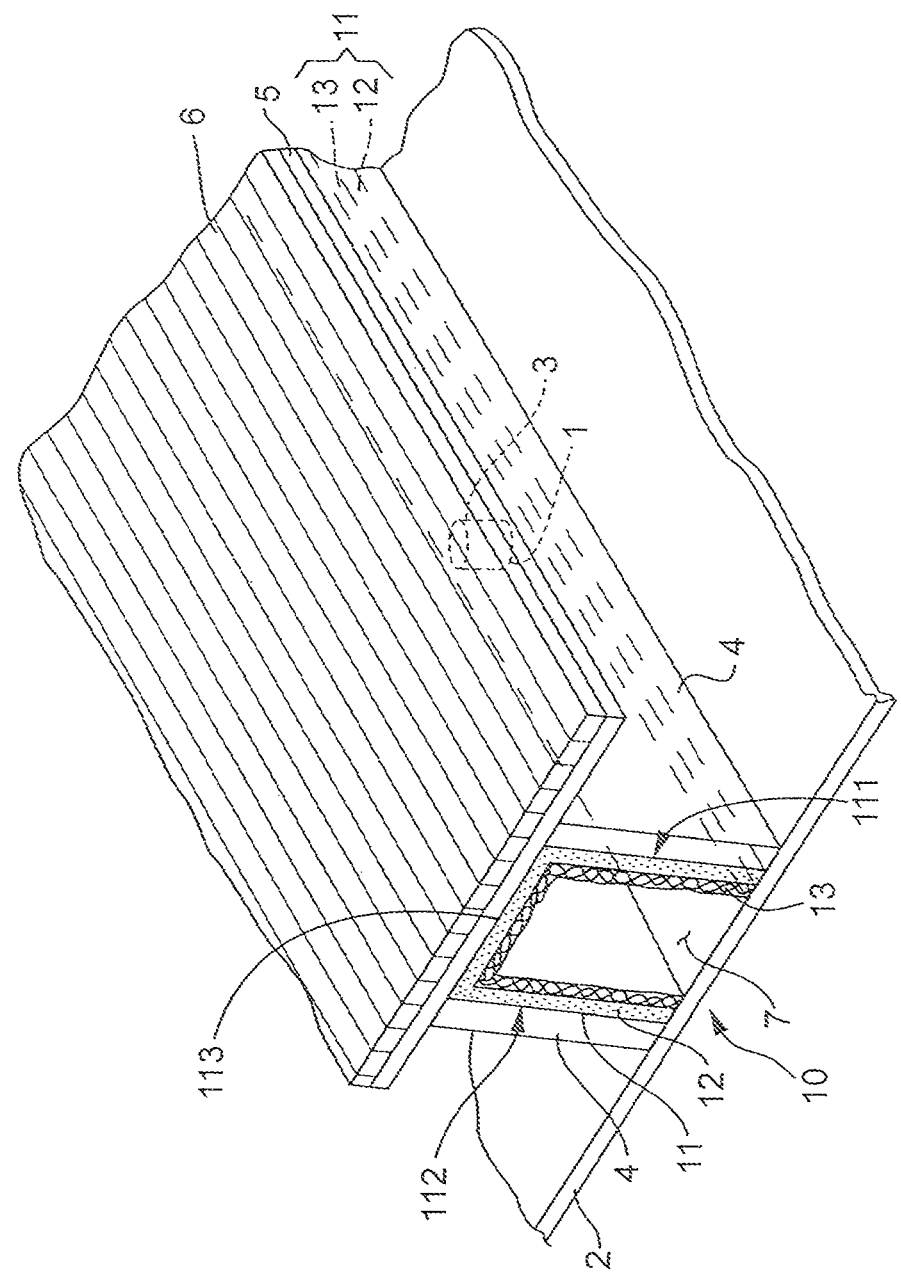
FIG. 1 is a perspective view illustrating the noise attenuation system in accordance with an embodiment of the present invention whereby the noise attenuation system is positioned between upper and lower floors.
Figure 2:
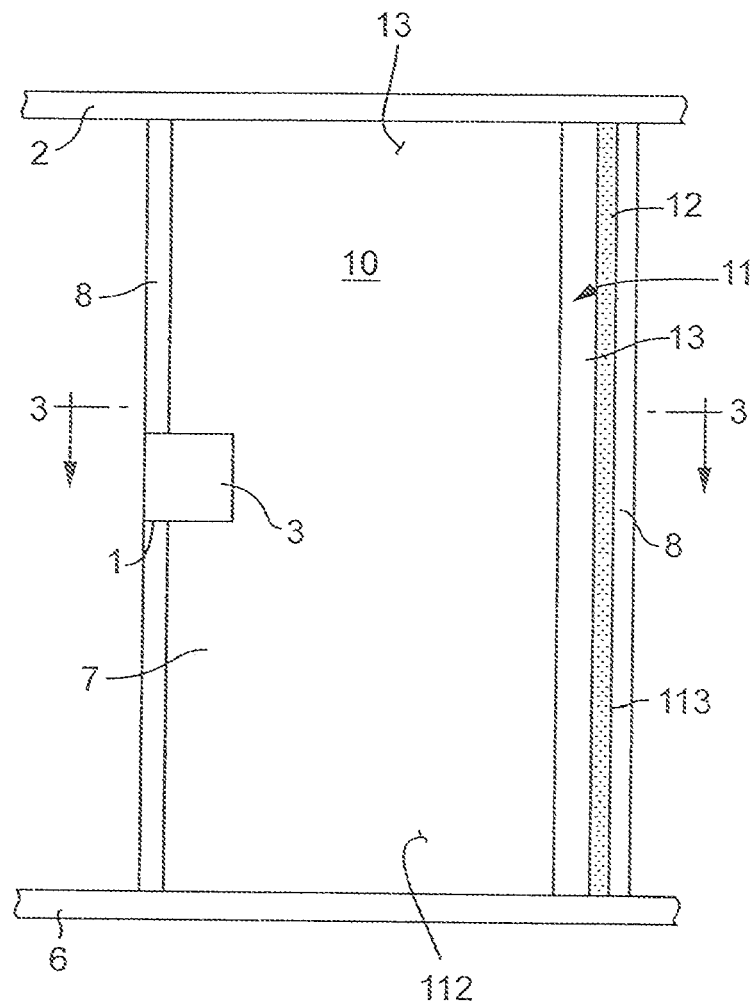
FIG. 2 is a partial side cross-sectional view of the noise attenuation system in accordance with the present invention positioned between adjoining walls.
Figure 3:
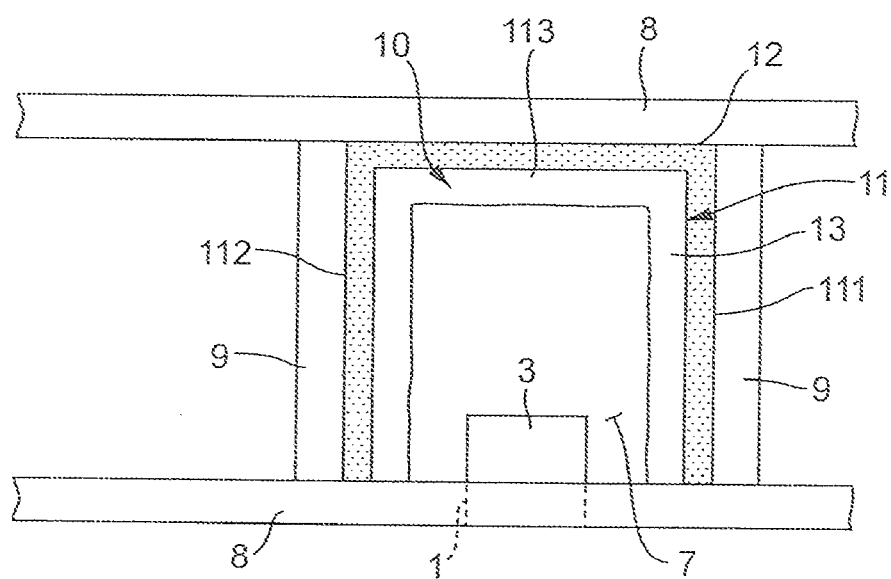
FIG. 3 is a cross-sectional view of the noise attenuation system taken along the 3-3 line in FIG. 2.

A system 10 for attenuating noise will now be described in greater detail in connection with FIGS. 1-4. For purpose of illustration, the system 10 for attenuating noise will be described in connection with the attenuation of noise associated with an opening 1 formed in a ceiling 2 for receipt of a mechanism 3, as illustrated in FIG. 1. The noise attenuation system 10 can also be used to attenuate noise associated with an opening formed in a wall 8, as shown in FIGS. 2 and 3. In accordance with the present invention, the mechanism 3 can be a recessed light fixture or any component that is recessed in a wall or ceiling including but not limited to electric outlet boxes, speakers, intercoms, exhaust fans, electrical heaters, video equipment including cameras and monitors and the like. Typically, the mechanism 3 is positioned between a pair of joists 4 or wall-studs 9. The joists 4 or studs 9 can be located between walls 8, as shown in FIGS. 2 and 3, or between the ceiling 2 and the subfloor 5, as shown in FIG. 1. The mechanism 3 can be mounted to one or both of the joists 4. It is also contemplated that the mechanism 3 can be solely supported by the ceiling 2, wall 8 or by a bracket (not shown) connected to one or more of the joists 4, the studs 9, wall 8 or the subfloor 5. The ceiling 2 of the room or space is attached to the lower side of joists 4. The subfloor 5 of the upper floor of an upper room is attached to the upper side of the joists 4. A flooring material 6 is then secured to the subfloor 5. In a wall installation, the walls 8 are connected to the sides of the studs 9.

In order to improve the transmission loss of noise between the ceiling 2 and the subfloor 5 and flooring material 6 or the walls 8, the noise attenuating system 10 includes a noise muffler 11 that is located in the area 7 surrounding, but usually not contacting the mechanism 3, as shown in FIGS. 1-3. The noise muffler 11 includes an outer barrier layer 12. The harrier layer 12 can be formed from a material, with a high STC harrier. The barrier layer 12 can be formed of a loaded vinyl (e.g., a one pound per square foot loaded vinyl). The barrier layer 12 can be formed from a material having an STC rating that is equal to or greater than the STC rating of the wall 8, floor 5, 6 or ceiling 2 when measured without the opening 1. Additionally, the material forming the barrier layer 12 can be a non-rigid material such that the layer 12 can be molded, shaped or manipulated to conform to the joists 4 and subfloor 5 or wall 8 in the vicinity of area 7. A more rigid form of the material can also be used when providing noise attenuation in an area having predetermined dimensions. The barrier layer 12 has a suitable STC rating such that any noise emitted from the mechanism 3 in the area substantially remains in the area 7 while the sound waves travel within the muffler 11.

Figure 5:
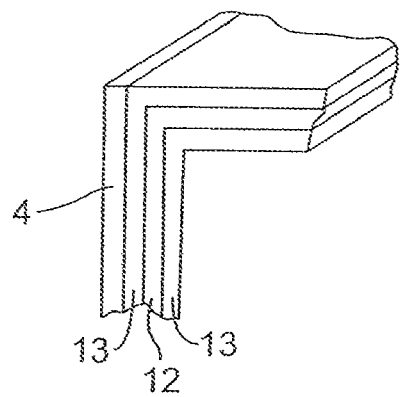
FIG. 5 is a partial perspective view illustrating a variation of the noise attenuation system in accordance with the present invention.

The noise muffler 11 further includes a noise absorbing layer 13, which is attached to or lines at least one side of the barrier layer 12, as shown in FIGS. 1 and 2. As shown in FIG. 5, the noise muffler 11 can include a pair of noise absorbing layers 13, which are located on opposing sides of the harrier layer 13. The second noise absorbing layer can function as a decoupler for potential low frequency noises. The sound waves emitted from the mechanism 3 are absorbed by the noise absorbing layer 13 before it exits the muffler 11. With such a construction, a suitable transmission loss is achieved. The noise absorbing layer 13 is preferably a high NRC rated material, where "NRC" stands for noise reduction coefficient and represents the average amount of sound absorbed by the material. The NRC rating typically ranges from 0.01 to 1.0. NRC ratings above 1 (e.g., 1.03) are also possible. The higher NRC rating, the greater the sound absorption. The noise absorbing layer 13 is chosen based upon the characteristics of the particular mechanism 3. Various materials are contemplated. In particular, the material forming the layer 13 is chosen for its sound absorbing qualities and its ability to withstand any heat emitted from the mechanism 3. As such, the material forming layer 13 for noise attenuation of a recessed stereo speaker can differ from the material used for noise attenuation of a recessed lighting fixture 3. Fiberglass and glass wool are considered to be suitable materials for the noise absorbing layer 13 for their sound absorbing and lire resistant qualities. The layer 13 may also be formed from a closely woven textile-like material formed from any suitable material provided the material has suitable sound absorbing properties and withstands a predetermined temperature. Additionally, it is preferable that the noise absorbing layer 13 be formed from a class A fire rated material. A suitable adhesive can be used to secure the noise absorbing layer 13 to the barrier layer 12. When multiple noise absorbing layers 13 are provided (e.g., FIG. 5), the layers can be formed from either the same material or a different material. Alternatively, the noise absorbing layer 13 can be connected to the barrier layer 12 when the layers 12 and 13 are secured to the joists 4 or subfloor 5 using suitable fasteners (not shown).

In the case of the stereo speaker, it is not necessary that the layer 13 withstand higher temperatures; rather, it is important that the material have high noise or sound absorption qualities to absorb the noise emitted into the area 7 by the speaker that may be transmitted through the joists 4 and the subfloor 5 and floor 6 into adjacent spaces. The barrier layer 12 will attenuate the noise that may be transmitted through the floor into the space above through the joists 4 and the ceiling, 2, while the noise absorbing layer 13 will absorb noise emitted into the area 7 by the speaker. Furthermore, it is important that the material does not adversely affect the acoustic wave of the speaker for the desired sound to be emitted into the space.

In contrast, the material for the layer 13 used in connection with a recessed lighting fixture must be able to withstand higher temperatures emitted from the mechanism 3. The noise absorbing qualities of the material in this application are not as important because the barrier layer 12 will provide the primary noise attenuation. The muffler 11 can be sized to permit the dissipation of heat from the recessed fixture, if required.

As shown in FIGS. 1-3, the noise muffler 11 preferably includes sides 111 and 112, which extend along the joists 4 adjoining the area 7. An upper portion 113 is positioned adjacent the subfloor 5 (FIG. 1) or wall 8 (FIG. 3). The noise muffler 11 is preferably formed with open ends to permit venting. The noise muffler 11 can also include ends, not shown, when heat venting is not required such as for speaker enclosures and electric outlets, which extend between the joists 4 from the subfloors 5 to the ceiling. The ends, however, are not necessary if the length of the muffler is long enough, because the noise absorbing layer 13 substantially absorbs the sound waves before the sound waves can exit the ends of the muffler 11. The muffler 11 can provide a noise absorbing harrier having an STC rating that is equal to or greater than the ceiling and surrounding structure or wall and surrounding structure depending on the placement of the mechanism 3. As an example, the muffler 11 would travel from the ceiling up the joist 4 along the subfloor 5 above and down the other joist 4 to the ceiling 2 attached to the adjacent joist 4. As shown in FIG. 1, the muffler 11 surrounds the mechanism 3. The muffler 11 is intended to contain the noise generated from the mechanism 3 and/or transmitted through the walls, ceilings, joists, studs and floors of adjacent spaces thus creating a situation where the energy of the acoustic wave is forced to travel through the muffler 11. The muffler 11 is sized such that as the sound waves travel within the muffler 11, the sound waves are substantially absorbed by the layer 13 such that the noise is absorbed by the layer 13 before exiting the muffler 11.

The size of the muffler 11 may vary according to the particular noise attenuation application. The size of the muffler 11 is determined based upon several parameters including, but not limited to the heat generated from the mechanism 3 such that proper ventilation can be provided, the frequency of the noise to be contained by the muffler 11, the amount of transmission loss required, and the material used to form the layer 13. The number of fixtures 3 placed in a particular area will also impact the size of the muffler 11. For example, the number of recessed lights which may be located in a linear arrangement such that they are positioned between the same two joists 4 will impact the size of the muffler 11. The muffler 11 may be sized to extend the length of the joists 4 such that a single muffler 11 is provided for noise attenuation and proper ventilation.

Whatever the absorbing material chosen for the layer 13, it will attenuate the acoustic energy of the noise source (i.e., the fixture 13). Since absorbers have a known noise absorption in a specific frequency, the length of the muffler 11 is to be governed by the frequency of concern, for example, substantially the lowest frequency of the noise, and the material used. The length is determined such that the noise emitted from the mechanism 3 is substantially absorbed by the muffler 11 before exiting the muffler 11. The length of the noise muffler 11 can be determined based upon a determination of the wavelength $\lambda$ of the noise (e.g. substantially the lowest frequency of the noise). The wavelength $\lambda$ is determined based upon the velocity of the sound waves $v_w$ and the frequency $f$ of the noise where:

$$\lambda = v_w/f$$

Figure 4:
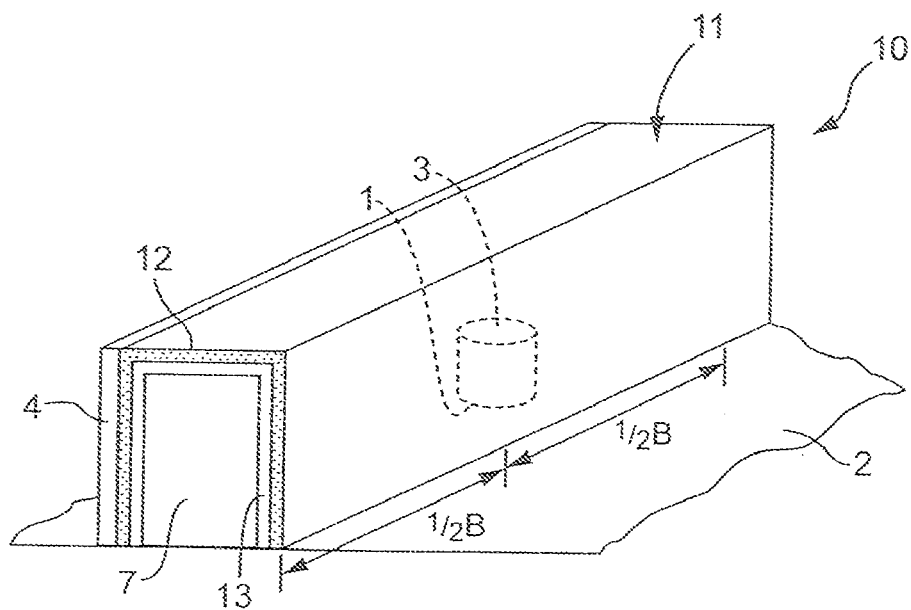
FIG. 4 is a perspective view illustrating the length of the noise attenuation system in accordance with the present invention.

As shown in FIG. 4, the minimum length of the muffler 11 is $\beta$ where:

$$\beta = 2\lambda/NRC$$

The NRC rating is chosen based upon the material forming layer 13 at a given frequency $f$.

Example 1

The frequency $f$ of concern is 500 Hz. The velocity of the sound wave $v_w$ is 1100 ft/sec. Using this information, the approximate desired length of the muffler 11 can be determined.

$$\lambda = 1100 \text{ ft/sec}/500 \text{ Hz} = 2.2 \text{ ft}$$

The NRC coefficient for a material for using in absorbing sound waves with a frequency $f$ of 500 Hz is 0.85.

$$\beta = 2\lambda/NRC = 2(2.2 \text{ ft})/0.85 = 5.2 \text{ ft}$$

The minimum length of the muffler 11 is approximately 5.2 ft with the mechanism 3 being located approximately in the center of the muffler 11 (i.e., ½$\beta$ as shown in FIG. 4). This determined minimum length of the muffler 11 will provide adequate noise attenuation whereby the sound waves will be absorbed prior to exiting the muffler 11 and can provide sufficient space to permit ventilation of the mechanism 3 and dissipation of any heat emitted from the mechanism 3.

Example 2

The frequency $f$ of concern is 125 Hz. The velocity of the sound wave $v_w$ is 1000 ft/sec. Using this information, the approximate length of the muffler 11 can be determined.

$$\lambda = 1100 \text{ ft/sec}/125 \text{ Hz} = 8.8 \text{ ft}$$

The NRC coefficient for a material for using in absorbing sound waves with a frequency $f$ of 125 Hz is 0.65.

$$\beta = 2\lambda/NRC = 2(8.8 \text{ ft})/0.65 = 27 \text{ ft}$$

The minimum length of the muffler 11 is approximately 27 ft with the mechanism 3 being located approximately in the center of the muffler 11 (i.e., ½$\beta$ as shown in FIG. 4). This determined length of the muffler 11 will provide adequate noise attenuation whereby the sound waves will be absorbed prior to exiting the muffler 11 and can provide sufficient space to permit ventilation of the mechanism 3 and dissipation of any heat emitted from the mechanism 3.

The equation for $\beta$ above will result in muffler 11 absorbing substantially all of the noise generated by mechanism 3. However, ceiling 2, wall 8, joists 4, etc. will not block all of the noise generated by mechanism 3. In some applications, muffler 11 need not absorb any more noise than the surrounding structures. In this case, the minimum length $\beta$ of the muffler 11 is:

$$\beta = 2\lambda/NRC \cdot \alpha_1$$

where $\alpha_1 = (T_{LNH} - T_{LH})/T_{LNH}$ $T_{LNH}$ is the transmission loss through ceiling 2, wall 8, etc. without opening 1.

$T_{LNH}$ is the transmission loss through ceiling 2, wall 8, etc. with opening 1.

It is intended that the noise attenuation system 10 in accordance with the present invention may be installed during the construction phase of the structure or as a retrofit after construction, but during the installation of the fixtures 3 during for example a home or office remodeling. The installation of the system 10 during a retrofit or remodel may require the removal of a least a portion of the wall or ceiling 2 to permit insertion of the muffler 3. Additionally, any insulation located between the joists 4 would also have to be removed in the area surrounding the mechanism 3, if heat ventilation is required.

It will be appreciated that numerous modifications to and departures from the preferred embodiments described above will occur to those having skill in the art. The present invention is not intended to be limited to sound insulation between the floor and ceiling of a structure, rather, the system 10 can be used between walls or in any structure where sound insulation is desired. Furthermore, the terminology fixture is not intended to be limited to recessed lighting; rather, the terminology fixture may include any component that may be mounted in a recess or hole in a wall, ceiling or other structure. Furthermore, the muffler 11 can be used in any application where it is desirable to increase transmission loss through the recessed fixture and/or provided ventilation of the recessed fixture to permit dissipation of heat from the recessed fixture when necessary, or just an opening for such items as extensive wiring. It is also contemplated that the noise absorbing layer 13 can be formed from one or more layers which together form the layer 13. Thus, it is intended that the present invention covers the modifications and variations of the invention, provided they come within the scope of the appended claims and their equivalents.

What is claimed is:

1. A noise attenuation system disposed in a structure including a wall or ceiling, the wall or ceiling including a board having an exposed surface and an opposite surface, comprising:
   a sound generating object disposed in or on the structure; and
   a noise absorbing muffler positioned within the structure and forming an elongated cavity and having an edge abutting the opposite surface of the board of the wall or ceiling, at least a portion of the object positioned at a cavity opening or extending into the cavity, or both,
   wherein the noise absorbing muffler comprises:
       an outer barrier layer that limits the passage of sound waves emitted from the object therethrough; and
       at least one noise absorbing layer positioned adjacent the outer barrier layer,
   wherein the noise absorbing layer absorbs a predetermined amount of sound waves emitted from the object, wherein a length of the cavity defined by the noise absorbing muffler is selected, based upon the substantially lowest frequency of the noise to be absorbed, the material used for the noise absorbing muffler and the materials surrounding the sound generating object, such that the noise absorbing layer substantially absorbs at least as much of the sound waves emitted by the object as does the structure surrounding the object, and wherein the outer barrier layer has a sound transmission class rating equal to or greater than the sound transmission class rating of the structure inclusive of any wallboard(s) and air space or any wallboard(s) and air space and insulation having been removed to dispose the object within or on the structure, and wherein the object requires ventilation within the structure and the cavity formed by the noise absorbing muffler permits the dissipation of heat emitted from the object.

2. The noise attenuation system according to claim 1, wherein the outer barrier layer is formed from loaded vinyl.

3. The noise attenuation system according to claim 1, wherein the at least one noise absorbing layer is formed from a fire resistant material.

4. The noise attenuation system according to claim 1, wherein the elongated cavity has open ends.

5. The noise attenuation system according to claim 1, wherein the at least one noise absorbing layer comprises; a first noise absorbing layer located on one side of the outer barrier layer; and a second noise absorbing layer located on an opposite side of the outer barrier layer.

6. A method for attenuating noise emitted from a recessed object mounted on a structure or in an opening in the structure including a wall or ceiling including a board having an exposed surface and an opposite surface, comprising:

determining a length of a cavity defined by a noise attenuating muffler based upon a substantially longest wavelength of a sound wave generated by the object, the material used for the noise attenuating muffler and the difference in transmission loss through the structure with and without the opening;

locating the noise attenuating muffler within the structure so that an edge of the noise attenuating muffler abuts the opposite surface of the board in an area surrounding the recessed object, such that the noise attenuating muffler substantially absorbs at least as much of the sound waves emitted from the recessed object as does the structure surrounding the object, wherein the noise attenuating muffler comprises an outer barrier layer that limits the passage of sound waves emitted from the recessed object into the structure and a noise absorbing layer positioned adjacent the outer barrier layer and, wherein the noise absorbing layer absorbs a predetermined amount of sound waves emitted from the recessed object;

determining the sound transmission class rating of the structure without the opening;

selecting a suitable material for forming the outer barrier layer that has a sound transmission class rating that is at least equal to or greater than the sound transmission class rating of the structure inclusive of any wallboard(s) and air space or any wallboard(s) and air space and insulation having been removed to dispose the object within the structure, and in a case where the object requires ventilation within the structure, configuring the cavity formed by the noise absorbing muffler so that the noise absorbing muffler permits the dissipation of heat emitted from the object.

7. A method for attenuating noise emitted from a hole or opening in a board included in a wall or ceiling, the board having an exposed surface and an opposite surface, comprising:

determining a length of a cavity defined by a noise attenuating muffler based upon a substantially longest wavelength of a sound wave to be attenuated, the material used for the noise attenuating muffler and the difference in transmission loss through the structure with and without the hole or opening;

locating the noise attenuating muffler within the structure so that an edge of the noise attenuating muffler abuts the opposite surface of the board in an area surrounding the hole or opening, such that the noise attenuating muffler substantially absorbs at least as much of the sound waves passing through the hole or opening as does the structure, wherein the noise attenuating muffler comprises:

an outer barrier layer that limits the passage of sound waves emitted from the hole or opening into the structure; and a noise absorbing layer positioned adjacent the outer barrier layer, wherein the noise absorbing layer absorbs a predetermined amount of sound waves emitted from the hole or opening;

determining the sound transmission class rating of the structure without the hole or opening;

selecting a suitable material for forming the outer barrier layer that has a sound transmission class rating that is at least equal to or greater than the sound transmission class rating of the structure inclusive of any wallboard(s) and air space or any wallboard(s) and air space and insulation having been removed to dispose the object within the structure, and in a case where the object requires ventilation within the structure, configuring the cavity formed by the noise absorbing muffler so that the noise absorbing muffler permits the dissipation of heat emitted from the object.

8. A noise attenuation system disposed in a structure that includes a wall or ceiling and at least a portion of a sound generating object positioned upon and extending into the structure, the wall or ceiling including a board having an exposed surface and an opposite surface, comprising:

a noise absorbing muffler positioned within the structure and forming an elongated cavity and having open ends and an edge abutting the opposite surface of the board of the wall or ceiling, at least a portion of the object extending into the cavity, wherein the noise absorbing muffler comprises:

an outer barrier layer that limits the passage of soundwaves emitted from the object therethrough; and at least one noise absorbing layer positioned adjacent the outer harrier layer, wherein the noise absorbing layer absorbs a predetermined amount of sound waves emitted from the object, wherein a length of the cavity defined by the noise absorbing muffler is selected, based upon the substantially lowest frequency of the noise to be absorbed, the material used for the noise absorbing muffler and the materials surrounding the sound generating structure, such that the noise absorbing layer substantially absorbs at least as much of the sound waves emitted by the object as absorbed by the surrounding structure, wherein the outer barrier layer has a sound transmission class rating equal to or greater than the sound transmission class rating of the structure inclusive of any wallboard(s) and air space or any wallboard(s) and air space and insulation having been removed to dispose the object from its position on or within the structure, and wherein the object requires ventilation within the structure and the cavity formed by the noise absorbing muffler permits the dissipation of heat emitted from the object.

9. The noise attenuation system according to claim 8, wherein the outer barrier layer is formed from loaded vinyl.

10. The noise attenuation system according to claim 8, wherein the at least one noise absorbing layer is formed from a tire resistant material.

11. The noise attenuation system according to claim 8, wherein the noise absorbing muffler is shaped to conform to the surrounding structure.

12. The noise attenuation system according to claim 8, wherein the cavity has open ends.

13. The noise attenuation system according to claim 8, wherein the at least one noise absorbing layer comprises:
   a first noise absorbing layer located on one side of the outer barrier layer; and a second noise absorbing layer located on an opposite side of the outer barrier layer.

14. A noise attenuation system disposed in a structure including a wall or ceiling, the wall or ceiling including a board having an exposed surface and an opposite surface, for attenuating noise emitted from a hole or opening in the board, comprising:
   a noise absorbing muffler positioned within the structure and forming an elongated cavity substantially surrounding the hole or an object positioned at the hole including a portion extending into the cavity and having an edge abutting the opposite surface of the board, wherein the noise absorbing muffler comprises:
      an outer barrier layer that limits the passage of sound waves emitted from the hole or opening therethrough; and
      at least one noise absorbing layer positioned adjacent the outer barrier layer, wherein the noise absorbing layer absorbs a predetermined amount of sound waves emitted from the hole or opening, wherein a length of the cavity defined by the noise absorbing muffler is selected, based upon the substantially lowest frequency of the noise to be absorbed, the material used for the noise absorbing muffler and the difference in transmission loss through the structure with or without the hole or opening, such that the noise absorbing layer substantially absorbs at least as much of the sound waves emitted from the hole or opening as does the structure, wherein the outer barrier layer has a sound transmission class rating equal to or greater than the sound transmission class rating of the structure inclusive of any wallboard(s) and air space or any wallboard(s) and air space and insulation having been removed to dispose the object or object portion on or within the structure, and wherein the object requires ventilation within the structure and the cavity formed by the noise absorbing muffler permits the dissipation of heat emitted from the object.

15. The noise attenuation system according to claim 14, wherein the outer barrier layer is formed from loaded vinyl.

16. The noise attenuation system according to claim 14, wherein the at least one noise absorbing layer is formed from a tire resistant material.

17. The noise attenuation system according to claim 14, wherein the elongated cavity has open ends.

18. The noise attenuation system according to claim 14, wherein the noise absorbing muffler is shaped to conform to the surrounding structure.

19. The noise attenuation system according to claim 14, wherein the at least one noise absorbing layer comprises:
   a first noise absorbing layer located on one side of the outer barrier layer; and
   a second noise absorbing layer located on an opposite side of the outer barrier layer.

* * * * *